United States Patent [19]
Brandien et al.

[11] Patent Number: 6,134,561
[45] Date of Patent: *Oct. 17, 2000

[54] SYSTEM FOR TRACKING THE RECEIPT AND INTERNAL DELIVERY OF ITEMS SUCH AS PACKAGES

[75] Inventors: Clint Brandien, Prospect; Shulong Sun, Orange; Beth Ann Walsh, Wolcott; Ray Mather, Southbury, all of Conn.

[73] Assignee: Pitney Bowes Inc., Stamford, Conn.

[*] Notice: Under 35 U.S.C. 154(b), the term of this patent shall be extended for 2 days.

[21] Appl. No.: 08/998,560

[22] Filed: Dec. 29, 1997

[51] Int. Cl.⁷ ...................................................... G06F 9/00
[52] U.S. Cl. ............................................. 707/104; 707/1
[58] Field of Search ......................................... 707/1–204

[56] References Cited

U.S. PATENT DOCUMENTS

| | | | |
|---|---|---|---|
| 5,631,827 | 5/1997 | Nicholls et al. | 705/28 |
| 5,656,799 | 8/1997 | Ramsden et al. | 177/2 |
| 5,770,841 | 6/1998 | Moed et al. | 235/375 |
| 5,831,220 | 11/1998 | Ramsden et al. | 177/1 |
| 5,869,819 | 2/1999 | Knowles et al. | 235/375 |
| 5,880,451 | 3/1999 | Smith et al. | 235/470 |

Primary Examiner—Hosain T. Alam
Assistant Examiner—John G. Mills
Attorney, Agent, or Firm—Philip E. Levy; Michael E. Melton; Charles R. Malandra, Jr.

[57] ABSTRACT

A computer based package delivery and control system for tracking receipt and internal delivery of items such as packages. The system maintains a database of records of information relating to packages which have been received by an organization at a facility such as a mail room. The records include the names of employees who are the ultimate recipients of the packages as well as the internal delivery status of the packages. The system is also provided with a programmable, portable data terminal which has a capability for the input of graphical data and includes an integral bar code scanner. The portable data terminal may be used to input package information to the data processing system when packages are received. From time to time, the data processing system downloads internal delivery manifests to the portable data terminal, which may then be used to deliver packages to the employees who are the intended recipients. When the packages are delivered, the data terminal can be used to capture information about the delivery, such as the name of the person receiving the package, and, if required, a signature may be input to the data terminal. This internal delivery information is then uploaded to the data processing system, which updates the records to reflect the new delivery status.

15 Claims, 5 Drawing Sheets

FIG. 8

ARRIVAL®  VERSION 2.5
GROUP PACKAGES DELIVERY LOG

MAIL STOP
GROUP NAME    2C446

DELIVERIES    PIECES
GROUP TOTAL   _____    _____

SELECTED      _____    _____

RECEIVED BY [_____]
SIGNATURE     [ DELETE ]

[                    ]

[   SAVE    DELIVERY   ]
[  CANCEL   DELIVERY   ]

[ RETURN ]

FIG. 9

ARRIVAL®  VERSION 2.5
GROUP PACKAGES DELIVERY LOG

TRACKING #
GROUP NAME    RANDOM GROUP

DELIVERIES    PIECES
GROUP TOTAL   _____    _____

SELECTED      _____    _____

RECEIVED BY [_____]
SIGNATURE     [ DELETE ]

[                    ]

[   SAVE    DELIVERY   ]
[  CANCEL   DELIVERY   ]

[ RETURN ]

SYSTEM FOR TRACKING THE RECEIPT AND INTERNAL DELIVERY OF ITEMS SUCH AS PACKAGES

FIELD OF THE INVENTION

The subject invention relates to a system for tracking the receipt of items such as packages and the like by various organizations such as businesses, hotels, hospitals, schools or the like. More particularly, it relates to systems which maintain and update records of the receipt and internal delivery of items by such organizations so as to assure and document actual delivery to an addressee.

BACKGROUND OF THE INVENTION

Businesses and other large organizations typically will have a mailroom or delivery department which serves as a central point for the receipt of items such as mail, parcels, overnight packages and other such items. Once such an item has been received by the mailroom or receiving department, it must then be delivered internally. For large organizations, which may have thousands of employees, the internal delivery time may equal or exceed the time required for delivery from the sender to the organization. Also, it is not uncommon for such items to be mis-delivered or lost after receipt. Such occurrences can create delay, ill-will, and even the risk of substantial liability where an organization is charged with receipt of information which never actually reaches the responsible individual.

For these and other reasons, systems have been developed to track receipt and internal delivery of items within large organizations. One such known system is marketed by the assignee of the subject invention under the trade name of "ARRIVAL".

"ARRIVAL" is a software system which typically runs on a microcomputer to maintain a database of items received by a large organization. Typically the record for a received item will include information such as a tracking number provided by the carrier who delivered the item, date and time delivered, addressee (i.e., the employee or individual for whom the item is actually intended), carrier, name of the employee who actually received the package from the carrier, and other information which the receiving organization may consider of interest. The information may initially be entered by an operator through a keyboard or may be scanned from the package itself. Typically, a carrier will incorporate information such as a tracking number in bar code form on an item, and "ARRIVAL" has been marketed with a portable bar code scanner and data entry device for the remote input of such data. Also, it is known to use OCR techniques for the input of such data.

Systems such as "ARRIVAL" can also include a database of employees or other individuals who may be receiving items delivered to the organization, where the employee database will include internal addresses for the employees. "ARRIVAL", or other such systems, will then periodically select a group of undelivered items in accordance with selected criteria, access the employee database to determine the internal addresses to which the items are to be delivered, and generate a manifest for the internal delivery of the selected items. After the internal delivery is made, the records for those items are then updated to document the actual delivery to the employee.

While such systems have proven to be successful for their intended purpose, problems have remained with regard to the generation of a manifest of items for internal delivery. While the receiving process has been highly automated in the "ARRIVAL" system, internal delivery has remained paper-intensive. The manifest is printed and provided to a delivery person who then delivers the items, records internal information about the delivery, which may include a signature of the receiving party, on paper, and returns that information for manual entry into the database. With such a system, errors can occur when names or numbers are misread, the manifest may be lost or damaged, and errors can occur when information is entered into the database to update records with internal delivery information. Further, heretofore when a signature was obtained upon delivery, a record of that signature had to be maintained in a separate paper file.

Accordingly, it is an object of the subject invention to provide a system for tracking receipt and internal delivery of items which includes an improved mechanism for generation of manifests and recording of internal delivery information.

SUMMARY OF THE INVENTION

The above object is achieved, and the disadvantages of the prior art are overcome, in accordance with the subject invention by means of a system for tracking receipt and internal delivery of items such as mail or packages which are received by an organization at a facility such as a mailroom for further internal delivery. The system includes a data processing system which is programmed to maintain a database of records relating to such received items, each of the records identifying an internal delivery address and delivery status for one of the received items, and to generate a manifest which identifies selected received items for internal delivery. The system also includes a portable, programmable data terminal which has a capability to communicate with the data processing system and which is programmed to receive the manifest from the data processing system, input internal delivery information for the selected received items identified on the manifest, and to communicate the internal delivery information to the data processing system. The data processing system is programmed to respond to receipt of the internal delivery information to update the delivery status for the selected received items in accordance with the internal delivery information. The portable data terminal can also be programmed to identify groups of the selected items identified on the manifest so that only a single record of internal delivery information need be input for each group.

In accordance with aspect of the subject invention, the portable data terminal is further programmed to input item information relating to received items when the items are received and communicate the item information to the data processing system, and the data processing system is further programmed to receive the item information and initialize the records in accordance with such item information.

In accordance with another aspect of the subject invention, the item information is provided in barcode form and the portable data terminal includes a barcode scanner for input of the item information.

In accordance with another aspect of the subject invention, the portable data terminal is a pen terminal, which has a capability for input of graphical information, and the internal delivery information includes a graphical representation of a signature of a person receiving at least one of the selected items.

In accordance with still another aspect of the subject invention, the portable data terminal is programmed to sort the manifest on a selected parameter, such as an internal mail stop, in order to facilitate the internal delivery process.

Thus it can be seen that the subject invention achieves the above object and overcomes the disadvantages of the prior art by providing a system with a capability for automatic generation of internal delivery manifest, remote automated data collection of internal delivery information, and automatic updating of records relating to received items. Other objects and advantages of the subject invention will be apparent to those skilled in the art from consideration of the detailed description set forth below and the attached drawings.

BRIEF DESCRIPTION OF THE DRAWING

In the attached drawings, elements identified by the same number have substantially identical form and function.

FIGS. 8 and 9 show Group Packages Delivery Log screens for a portable data terminal used in the system of FIG. 1.

DETAILED DESCRIPTION OF THE PREFERRED EMBODIMENTS OF THE INVENTION

Figure 1:
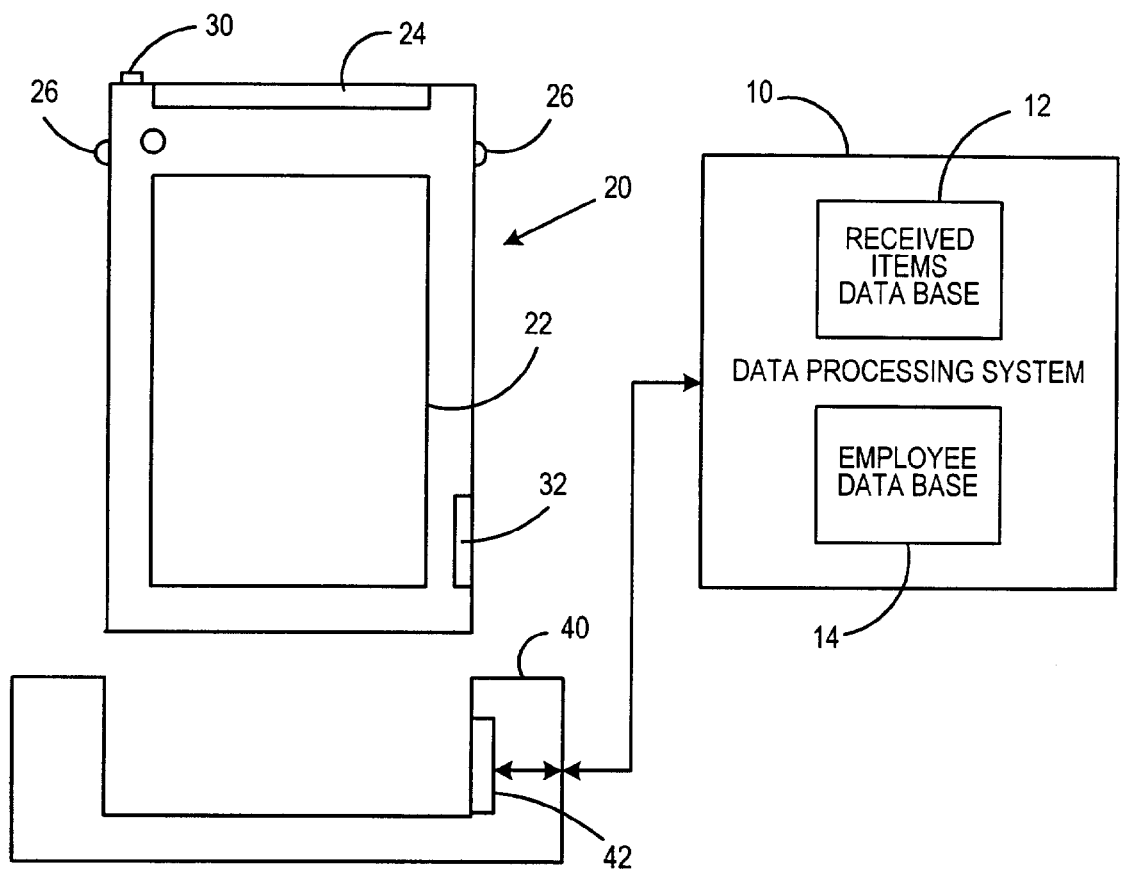
FIG. 1 shows a schematic block diagram of a system in accordance with the subject invention.

FIG. 1 shows a block diagram of an embodiment of the subject invention. Data processing system 10 is typically a microcomputer having a 486 (or faster) microprocessor, a hard disk drive, monitor, preferably 4 megabytes (MB) of random access memory, and a monitor. Data processing system 10 runs a program, such as the "ARRIVAL" program described above, for tracking the receipt and internal delivery of items.

Using such a program, data processing system 10 maintains Received Items database 12 containing records for items received by an organization. When an item is received, a record is initialized in database 12 with information such as the name of the employee to whom the item is addressed, date and time, carrier, name of the employee who received the package, and other information which may be of interest to various users. This item information may be input through a keyboard, by bar code scanning of bar code labels provided on the item, and may be input either at data processing system 10 or remotely. It is known to input initial item information by means of a portable data entry device.

Data processing system 10 also maintains an employee database, including at least employee names and internal addresses. (As used herein, the term "employee" includes employees of an organization and other persons who may be the internal addressee of an item, such as hotel guests.)

Periodically, data processing system 10 will process database 12 and database 14 to generate an internal delivery manifest using pre-selected condition logic. For example, data processing system 10 may be programmed to generate internal delivery manifests for all items received for particular buildings or floors, or received for particular individuals or departments. Data processing system 10 will typically also have other capabilities, such as an ability to generate reports, or to respond to queries with regard to particular received items, or an ability to print bar code labels for received items to facilitate internal delivery. Such capabilities do not form part of the subject invention and need not be discussed further here.

Systems such as data processing system 10 are known, as discussed above, but heretofore have generated internal delivery manifests in the form of paper documents. The system of FIG. 1 overcomes the difficulties of paper documents by providing portable, programmable data terminal 20, which is controlled by a microprocessor, such as an 8086 microprocessor, and includes random access memory for the storage of manifests in electronic form to facilitate the internal delivery process, as will be described further below. In the preferred embodiment of FIG. 1, data terminal 20 is a pen terminal, i.e., has a touch-sensitive screen 22, which is sensitive to pressure applied using a stylus (not shown). The stylus and screen 22 may be used either to activate soft keys displayed on screen 22 or to create a bit-mapped representation of the pattern traced out on screen 22 with the stylus to create a digital representation of a signature, as will be described further below. Data terminal 20 also includes an integral bar code scanner 24, which is used to read bar code labels in a known manner when either of buttons 26 is depressed. Data terminal 20 also includes On/Off Switch 30 and data coupling device 32, which is preferably an infrared data communications device, for communication with data processing system 10, as will be described further below.

The system of FIG. 1 also includes cradle 40 for enabling communication between data terminal 20 and data processing system 10. Data terminal 20 is mounted in cradle 40 so that communications device 32 is aligned with corresponding communications device 42 to establish communications between portable data terminal 20 and data processing system 10.

Typically, cradle 40 will also include charging circuitry (not shown) for recharging batteries (not shown) of data terminal 20.

Portable data terminals having a capability for input of graphical data are commercially available and further details of the construction and operation of data terminal 20 are not necessary for an understanding of the subject invention.

Those skilled in the art will recognize that communication between portable devices, such as data terminal 20, and data processing systems such as data processing system 10, is well known and may be carried out in any convenient manner, and, accordingly, need not be discussed further here for an understanding of the subject invention.

Initially, data terminal 20 is set up to establish operating parameters such as data and time, contrast setting for screen 22, etc. Initially, during setup, data terminal 20 may be configured to require or not require delivery confirmation when internal delivery of an item is made, and to allow or not allow duplicate tracking numbers on items to be delivered. Those skilled in the art will recognize that establishing such an initial configuration during setup is a routine matter which need not be discussed further here for understanding of the subject invention.

Also, in a preferred embodiment, during the initial setup, a data base of employee names for employees who are expected to receive items can be downloaded in a routine manner to data terminal 20 in order to facilitate internal delivery of items, as will be described further below.

Figure 2:
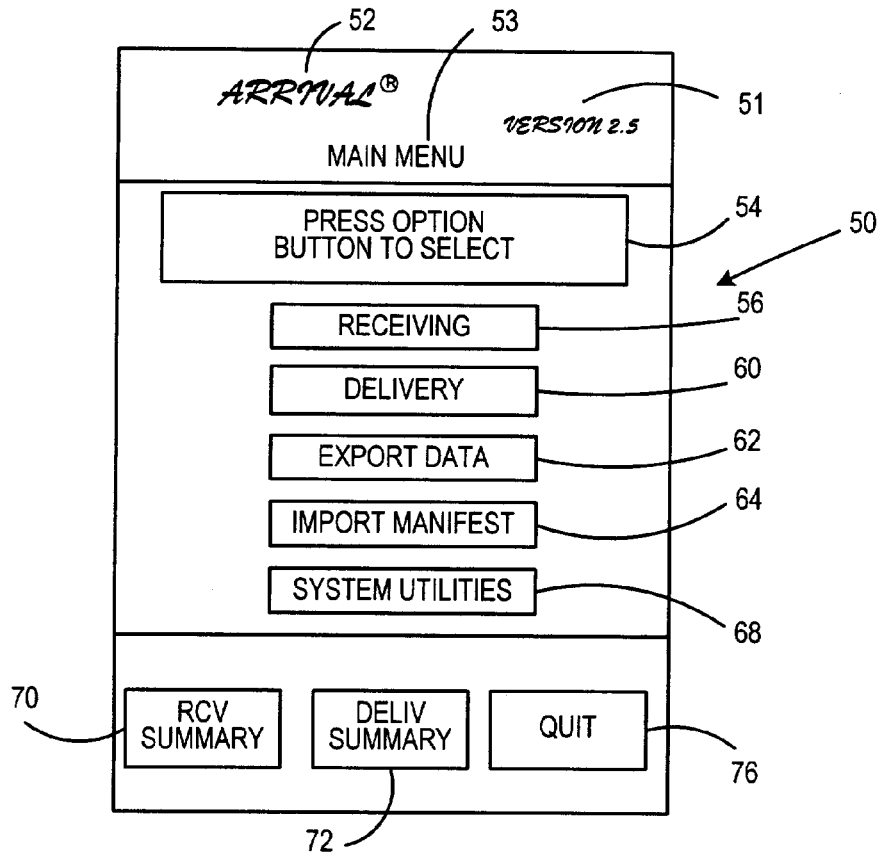
FIG. 2 shows a Main Menu screen for a portable data terminal used in the system of FIG. 1.

Once a user has activated data terminal 20, touch-sensitive screen 22 displays a Main Menu screen 50, as shown in FIG. 2. Main Menu screen 50 shows logo 52 and version number 51 to identify the software used in data processing system 10 and data terminal 20, and screen title 53 to identify the screen displayed, and instructions 54. Screen 50 also displays Receiving soft key 56, Delivery soft key 60, and Export Data soft key 62, Import Manifest soft key 64, and System Utilities soft key 68. Soft key 68 is activated to initialize data terminal 20, as described above. Each of these soft keys is activated by touching it with a stylus (not shown) to activate the corresponding operation, as will be described further below.

In response to activation of a soft key, data terminal 20 will execute routine operations, such as display of a new screen, input of data through either touch-sensitive screen 22 or bar code scanner 24, transfer of data to or from data processing system 10 and sorting and display of data stored in data terminal 20. Programming of portable data terminals to carry out such routine operations is well understood by those skilled in the art and need not be discussed in detail for an understanding of the subject invention.

Additionally, screen 50 displays auxiliary soft keys Receive Summary soft key 70, which displays a summary of information for each received package which has been entered into data terminal 20; Delivery Summary soft key 72, which displays a summary of delivery information for each item which has been delivered; and Quit soft key 76 which ends the session.

Figure 3:
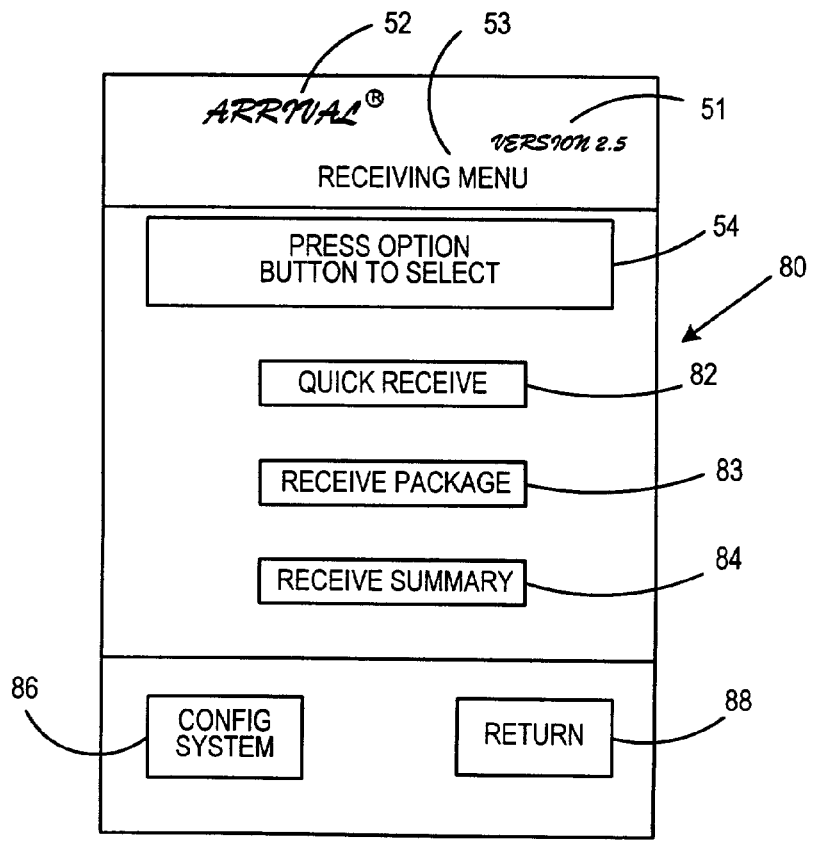
FIG. 3 shows a Receiving Menu screen for a portable data terminal used in the system of FIG. 1.

Activating Receiving soft key 56 causes data terminal 20 to display Receiving Menu Screen 80, as shown in FIG. 3, which shows logo 52, version number 51, title 53, and instructions 54, as described above. Screen 80 provides options for input of information as items are initially received by an organization at a facility such as a mailroom. Screen 80 includes Quick Receive soft key 82, Received Package soft key 83 and Receive Summary soft key 84.

Screen 80 also displays a Configure System auxiliary soft key 86, which allows a user to change system operating parameters, as described above, and Return auxiliary soft key 88 which returns data terminal 20 to the previously displayed screen.

Received Summary soft key 84 allows a user to display a summary of information relating to all items received, as described above, from screen 80.

Screen 80 provides a user with two modes for receiving items, a quick receive mode, which is initiated by activating Quick Receive soft key 82, and a receive package mode, which provides more complete collection of item information and which is initiated by activating Receive Package soft key 83.

Figure 4:
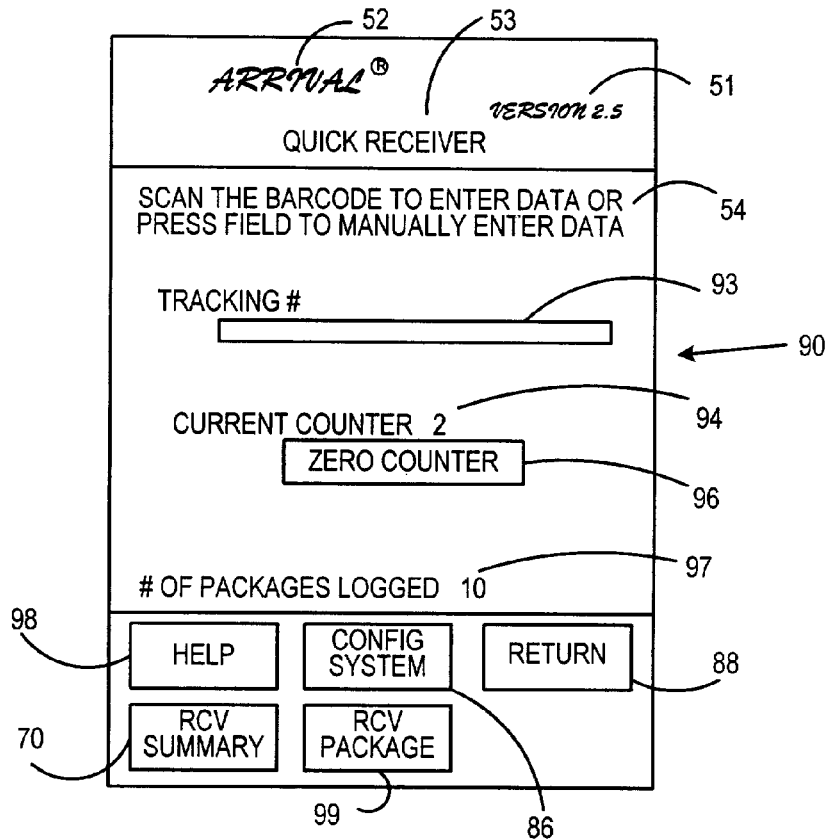
FIG. 4 shows a Quick Receive screen for a portable data terminal used in the system of FIG. 1.

When Quick Receive soft key 82 is activated, data terminal 20 displays Quick Receive Screen 90, as shown in FIG. 4, which displays logo 52, version number 51, title 53, and instructions 54.

Quick Receive Screen 90 displays a Tracking Number data entry field 93, a Current Counter field 94, which displays the number of items which have been received during the current session, a Zero Counter soft key 96 to zero Current Counter field 94, and a Packages Log display field 97, which displays the total number of packages which have been logged into data terminal 20.

Quick Receive screen 90 also displays a Receive Summary auxiliary soft key 70, a Configure System auxiliary soft key 86, and a Return auxiliary soft key 88; as well as a Help soft key 98 to display further instructions, and a Receive Package auxiliary soft key 99, which allows the user to switch to Receive Package Screen 100 to enter more extensive data with regard to a particular item, as will be described further below.

When Quick Receive Screen 90 is displayed, Data entry field 93 can be used to enter a tracking number, which is typically provided by a carrier for each item delivered. As provided by instructions 54, the tracking number may be entered into data entry field 93 either by scanning a bar code on the item with bar code scanner 24 or by entering the tracking number manually. To enter a tracking number manually, the user touches Data entry field 93, which causes data terminal 20 to display an alphanumeric keypad. The user then touches the appropriate sequence of soft keys displayed to enter the tracking number for the item being received. Current Counter field 94 is incremented for each tracking number entered and is zeroed when Zero Counter soft key 96 is activated. Field 97 displays the total number of packages which have been logged into data terminal 20.

Figure 5:
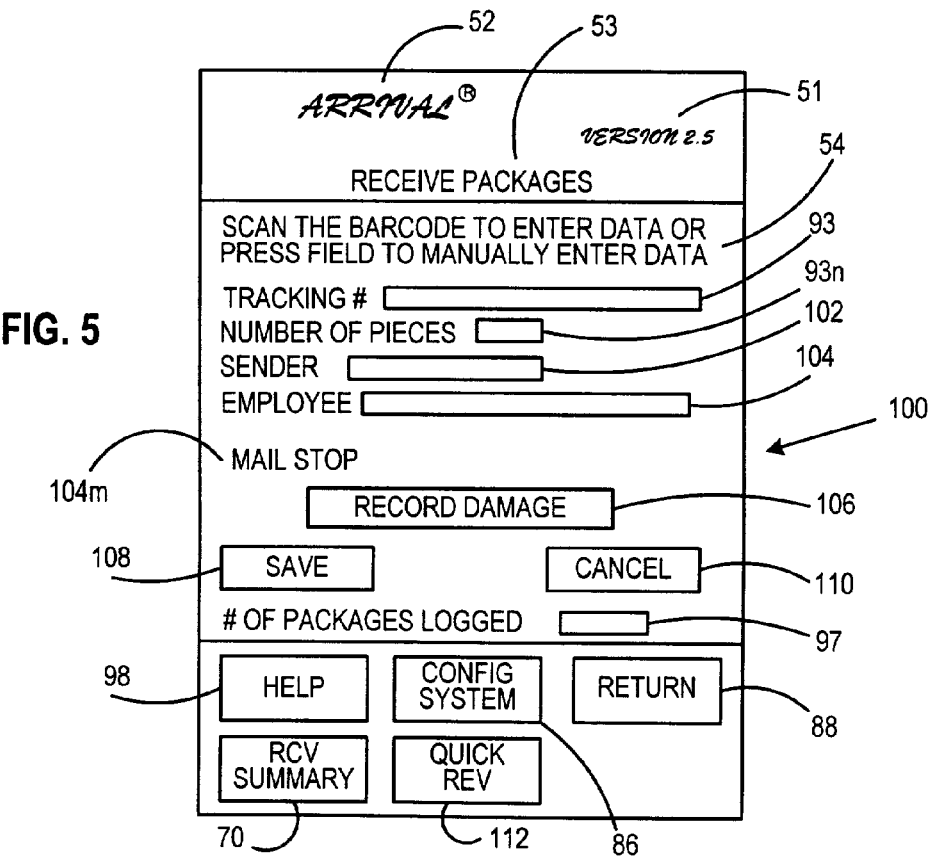
FIG. 5 shows a Receive Packages screen for a portable data terminal used in the system of FIG. 1.

Returning to FIG. 3, when Receive Package soft key 83 is activated (or Receive Package auxiliary soft key 99 is activated from screen 90) data terminal 20 controls touch-sensitive screen 22 to display Receive Package screen 100, as shown in FIG. 5.

Receive Package screen 100 displays logo 52, version number 51, title 53, and instructions 54. Receive Package screen 100 also displays Tracking Number data entry field 93, together with Number Of Pieces data entry field 93n, Sender data entry field 102, Employee data entry field 104, Mail Stop display field 104m, Record Damage soft key 106, Save soft key 108, Cancel soft key 110, Number of Packages Logged Display field 97; as well as auxiliary soft keys 70 (RCV Summary), 86 (Config. System), 88 (Return), and 98 (Help), as described above. Additionally, Receive Package screen 100 displays Quick Receive auxiliary soft key 112, which allows a user to switch to Quick Receive screen 90 to receive a particular item with only input of a tracking number.

As with Quick Receive screen 90, a tracking number may be input to Tracking Number data entry field 93 either by scanning a bar code using scanner 24 or by manually entering a number. Additionally, Number of Pieces data entry field 93n is used to enter the number of separate pieces which may comprise a single received item. Sender data entry field 102 is used to enter the identification of the sender of a received item, again either by bar code scanning or manual entry, and Employee data entry field 104 is used to enter the name of the employee who will receive the package. An employee name is entered either by bar code scanning a label provided on the received item, or, when a user touches Employee data entry field 104, data terminal 20 controls touch-sensitive screen 22 to display the list of employee names which was initially loaded into data terminal 20, and a user may scroll through the list and select a name for entry. When an employee name is selected, Mail Stop display field 104m displays that employee's mail stop, if available. Record Damage soft key 106 causes data terminal 20 to control touch-sensitive screen 22 to display the alphanumeric keypad, which can then be used to input a record of damage to an item received. Save soft keys 108 and Cancel soft keys 110 can then be used to either save or cancel the damage record entered. Number of Packages Logged display field 97 again displays the total number of packages logged.

Once all items to be received have been logged, a user then returns to Main Menu screen 60, places data terminal 20 in cradle 40, and activates Export Data soft key 62 to initiate communications with data processing system 10. Assuming that data processing system 10 is initialized for communications, data terminal 20 will then upload the item information file generated when the received items were logged to data processing system 10 in a conventional manner. Data processing system 10 will then initialize records for each item received in its database. This, and other operations of data processing system 10 in tracking receipt and internal delivery of items, are known and need not be discussed further here for an understanding of the subject invention.

A user then can activate Import Manifest soft key 64 to download an internal delivery manifest of items which have been received and are to be delivered to various employees. Again, assuming that data processing system 10 has been properly initialized, data processing system 10 will select a subgroup of received items to be delivered in accordance with pre-selected criteria. For example, data processing system 10 can be configured to select items to be delivered to a particular group of employees, or to a particular group of mail stops. Once a manifest has been imported to data terminal 20, a user may activate Delivery soft key 60 to initiate the delivery process.

When Delivery soft key 60 is activated, data terminal 20 controls the touch-sensitive screen 22 to display Delivery Menu screen 120, which displays Logo 52, Version number 51, and title 53 Delivery Menu screen 120 also displays Logged Deliveries soft key 122, Delivered By Group soft key 124, Delivery Summary soft key 126, which simply displays a summary of delivery information as discussed above, Listing Sort selection field 127, and Confirm Choice selection field 128. Delivery Menu screen 120 also displays auxiliary soft keys 86 (Config. System), 88 (Return) and 98 (Help).

Figure 6:
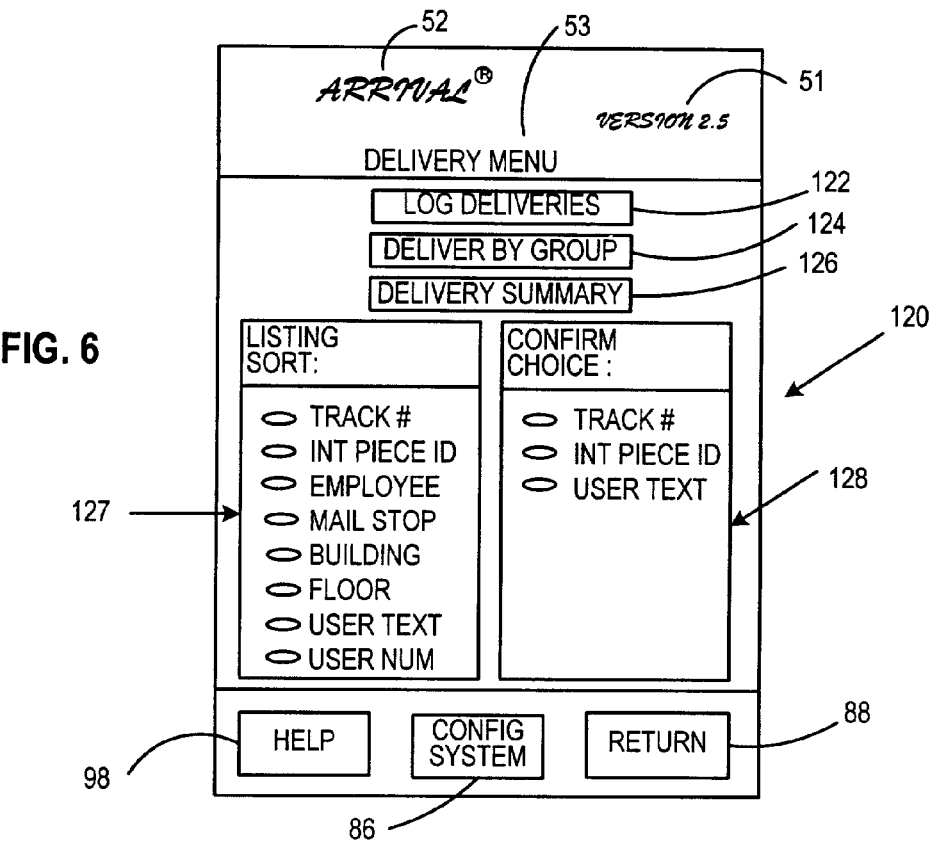
FIG. 6 shows a Delivery Menu screen for a portable data terminal used in the system of FIG. 1.

When a manifest has been imported and Delivery Menu screen 120 activated, a user can first sort the items to be delivered by selecting a sorting parameter from Listing Sort field 127. As shown in FIG. 6, any of a number of criteria may be selected. Typically, a manifest is sorted by mail stop for convenience in internal delivery.

A user can then use Confirm Choice selection field 128 to select item information which must be entered when the item is delivered to confirm that the correct item has been delivered. Choices shown in FIG. 6 are tracking number, internal piece identification or user text. If a Confirm Choice is selected from Confirm Choice selection field 128, that information must be correctly entered in order to log a delivery.

Figure 7:
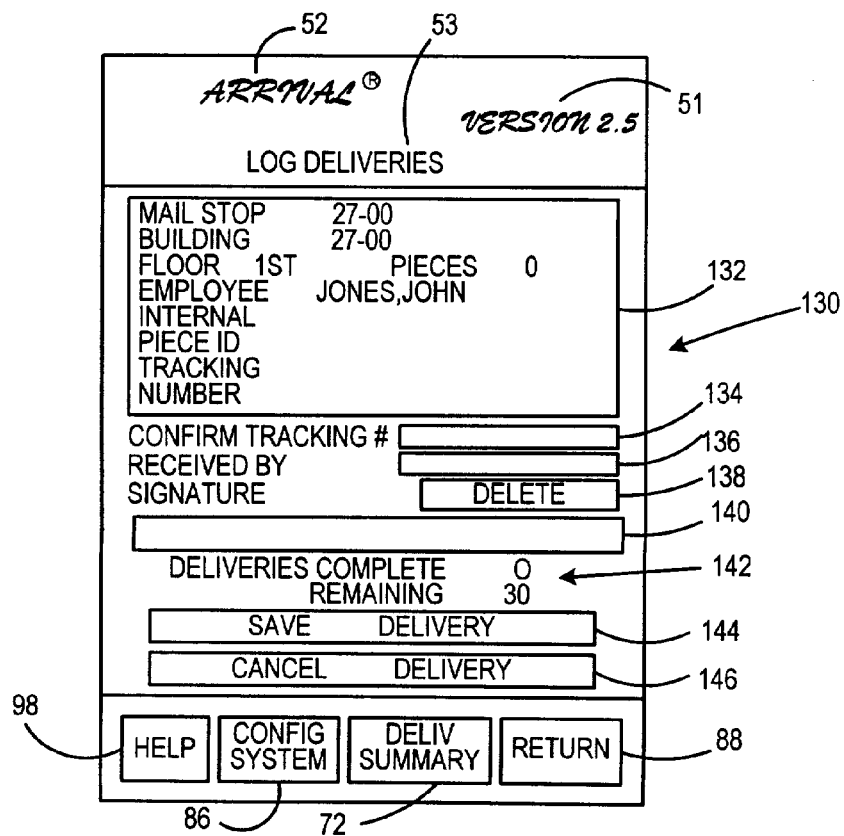
FIG. 7 shows a Log Deliveries screen for a portable data terminal used in the system of FIG. 1.

If a user then activates Log Delivery soft key 122, data terminal 20 controls touch-sensitive screen 22 to display Log Deliveries screen 130, as shown in FIG. 7. Log Deliveries screen 130 displays logo 52, version number 51, and title 53. Log Deliveries screen 130 also displays Record 132 for the item currently being delivered, Confirm Tracking # data entry field 134, Received By data entry field 136, Delete soft key 138, Signature graphic data entry field 140, Deliveries Complete/Remaining display field 142, SAVE Delivery soft key 144, and CANCEL Delivery soft key 146. Log Deliveries screen 130 also displays auxiliary soft keys 72 (Deliv. Summary), 86 (Config System), 88 (Return), and 98 (Help), as have been described above.

To log a delivery from Log deliveries screen 130, a user can enter a confirmation tracking number in Confirm Tracking # field 134 by scanning a bar code from the item to be delivered. Alternatively, by touching Confirm Tracking # field 134, a list of tracking numbers is displayed for selection. If a tracking number is missing, or a confirmation choice other than tracking number has been made from Confirm Choice field 128, a user can manually enter the confirmation information by causing data terminal 20 to display a keypad. A user then enters an employee named in Received By data entry field 136. The employee name can be scanned from the item to be delivered, selected from the list of employee names, or keyed in as described above for the confirmation information.

Graphic data entry field 140 allows the receiving party to sign for the item when it is delivered. Data terminal 20 captures the signature as a bit-mapped file from Graphic data entry field 140 in a conventional manner.

Delete soft key 138 deletes inadvertently entered or incorrect information. Deliveries Complete/Remaining field 142 displays a count of deliveries complete and remaining. SAVE Delivery soft key 144 and CANCEL Delivery 146 save or cancel delivery, respectively, when activated.

Returning to FIG. 6, if a user activates Deliver By Group soft key 124, data terminal 20 will group items to be delivered together so that delivery information need only be entered once for each group of items. Data terminal 20 will group items in one of two ways. When Deliver By Group soft key 124 is activated, data terminal 20 will display a listing of items to be delivered. A user can then select one item from the listing and control data terminal 20 to group all items which have the same sortation parameter selected from Listing Sort field 127 in FIG. 6. Particular items may then be deleted from the group. Alternatively, a user can randomly select items from the listing or can scan tracking numbers from items to be delivered to form a random group.

FIGS. 8 and 9 show a Group Packages Delivery Log screen 150. In FIG. 8, Logo 52, Version number 51, and title 53 are displayed. Group field 151 displays the group name. In FIG. 8, Group field 151 identifies the group of items to be delivered to a particular mail stop. Deliveries/Pieces field 152 displays a description of the group. Received By data entry field 136, Delete soft key 138, Graphic data entry field 140, and soft keys 144 (SAVE Delivery) and 146 (CANCEL Delivery) function in the same manner as described with respect to screen 130 shown in FIG. 7, Group Packages Delivery Log screen 150 also displays RETURN auxiliary soft key 88.

FIG. 9 shows Group Packages Delivery Log screen 150 when a random group has been selected. Group Packages Delivery Log screen 150 differs in FIG. 9 only in that Group field 151 shows that a random group of selected tracking numbers has been selected.

Once items on a manifest have been delivered, the internal delivery information which has been loaded into data terminal 20 can be transmitted to data processing system 10, in a manner substantially identical to that which the manifest was received, by activating soft key 62 from screen 50.

The preferred embodiments described above have been provided by way of illustration only, and those skilled in the art will recognize numerous other embodiments of the subject invention from the detailed description set forth above and the attached drawings. Accordingly, limitations on the claimed invention are to be found only in the claims set forth below.

What is claimed is:

1. A system for tracking receipt and internal delivery of items, comprising:
   a) a data processing system programmed to:
      a1) maintain a data base of records relating to received items, each of said records identifying an internal delivery address and internal delivery status for a corresponding one of said received items; and a2) generate a manifest for selected ones of said received items;

b) a portable, programmable data terminal having a capability to communicate with said data processing system and programmed to:

b1) receive said manifest from said data processing system;

b2) input internal delivery information for said selected received items; and b3) communicate said internal delivery information to said data processing system; wherein c) said data processing system is further programmed to receive said internal delivery information and update said internal delivery status for said selected received items in accordance with said internal delivery information.

2. A system as described in claim 1, wherein:

a) said portable data terminal is further programmed to input item information relating to said received items when said items are received and communicate said item information to said data processing system; and b) said data processing system is further programmed to receive said item information and initialize said records in accordance with said item information.

3. A system as described in claim 2, wherein at least some of said item information is provided in bar code form and said portable data terminal includes a bar code scanner for input of said item information.

4. A system as described in claim 1 wherein said portable data terminal is a pen terminal and said internal delivery information includes a graphical representation of a signature of a person receiving at least one of said selected received items.

5. A system as described in claim 1 wherein said portable data terminal is further programmed to sort said manifest on a selected parameter.

6. A system for tracking receipt and internal delivery of items, comprising:

a) a data processing system programmed to:

a1) maintain a database of records relating to received items, each of said records identifying an internal delivery address and internal delivery status for a corresponding one of said received items; and a2) generate a manifest of selected ones of said received items;

b) a portable, programmable data terminal having a capability to communicate with said data processing system and programmed to:

b1) receive said manifest from said data processing system;

b2) identify groups of said selected received articles which are to be delivered to a particular addressee;

b3) input a single record of internal delivery information for each of said groups of selected received items; and b4) communicate said internal delivery information to said data processing system; wherein c) said data processing system is further programmed to receive said internal delivery information and update said delivery status for said selected received items in accordance with said internal delivery information.

7. A system as described in claim 6 wherein:

a) said portable data terminal is further programmed to input item information relating to said received items when said items are received and communicate said item information to said data processing system; and b) said data processing system is further programmed to receive said item information and initialize said records in accordance with said item information.

8. A system as described in claim 7 wherein at least some of the said item information is provided in bar code form and said portable data terminal includes a bar code scanner for input of said item information.

9. A system as described in claim 6 wherein said portable data terminal is a pen terminal and said internal delivery information includes a graphical representation of a signature of a person receiving at least one of said selected received items.

10. A system as described in claim 6 wherein said portable data terminal is further programmed to sort said manifest on a selected parameter.

11. A portable, programmable data terminal for use with a data processing system for tracking receipt and internal delivery of items, said portable terminal being programmed to:

a) input from said data processing system a manifest of selected items who receipt has been recorded by said data processing system;

b) input internal delivery information for said selected items; and c) communicate said delivery information to said data processing system; whereby d) said data processing system can update a delivery status of said selected items.

12. A terminal as described in claim 11 wherein:

a) said portable data terminal is further programmed to input item information relating to said received items when said items are received and communicate said item information to said data processing system; and b) said data processing system is further programmed to receive said item information and initialize said records in accordance with said item information.

13. A terminal as described in claim 12 wherein at least some of the said item information is provided in bar code form and said portable data terminal includes a bar code scanner for input of said item information.

14. A terminal as described in claim 11 wherein said portable data terminal is a pen terminal and said internal delivery information includes a graphical representation of a signature of a person receiving at least one of said selected items.

15. A terminal as described in claim 11 wherein data terminal is further programmed to sort said manifest on a selected parameter.

* * * * *